(12) United States Patent
Kamide et al.

(10) Patent No.: US 10,455,180 B2
(45) Date of Patent: Oct. 22, 2019

(54) ELECTRONIC APPARATUS AND METHOD FOR CONDITIONALLY PROVIDING IMAGE PROCESSING BY AN EXTERNAL APPARATUS

(71) Applicant: NIKON CORPORATION, Tokyo (JP)

(72) Inventors: Sho Kamide, Yokohama (JP); Yasuyuki Motoki, Yokohama (JP); Kunihiro Kuwano, Kawasaki (JP); Teppei Okuyama, Tokyo (JP); Takeo Motohashi, Matsudo (JP); Yae Jotaki, Kawasaki (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/204,163

(22) Filed: Nov. 29, 2018

(65) Prior Publication Data

US 2019/0098246 A1    Mar. 28, 2019

Related U.S. Application Data (60) Division of application No. 15/645,095, filed on Jul. 10, 2017, now Pat. No. 10,178,338, which is a
(Continued)

(30) Foreign Application Priority Data

Feb. 28, 2013 (JP) .................................. 2013-039128

(51) Int. Cl.
*H04N 9/73* (2006.01)
*H04N 5/44* (2011.01)
(Continued)

(52) U.S. Cl.
CPC ............. *H04N 5/44* (2013.01); *G06K 9/4604* (2013.01); *G06T 7/13* (2017.01); *H04N 1/00244* (2013.01);
(Continued)

(58) Field of Classification Search
None
See application file for complete search history.

(56) References Cited

U.S. PATENT DOCUMENTS 6,670,933 B1    12/2003    Yamazaki
2002/0147773 A1    10/2002    Herman
(Continued)

FOREIGN PATENT DOCUMENTS

CN    101010948 A    8/2007
JP    2002-152453 A    5/2002
(Continued)

OTHER PUBLICATIONS

Sep. 10, 2013 International Search Report issued in International Patent Application No. PCT/JP2013/071711.
(Continued)

*Primary Examiner* — Stephen P Coleman
(74) *Attorney, Agent, or Firm* — Oliff PLC (57) ABSTRACT

An electronic apparatus includes a processing unit that processes an image capture signal captured by an image capturing unit, a communication unit that is capable of transmitting the image capture signal captured by the image capturing unit to an external apparatus, and a determination unit that determines whether or not to transmit the image capture signal to the external apparatus, according to a capture setting for the image capturing unit.

22 Claims, 5 Drawing Sheets

Related U.S. Application Data continuation of application No. 14/768,924, filed as application No. PCT/JP2013/071711 on Aug. 9, 2013, now abandoned.

(51) Int. Cl.
*H04N 1/00* (2006.01)
*H04N 5/232* (2006.01)
*G06K 9/46* (2006.01)
*G06T 7/13* (2017.01)

(52) U.S. Cl.
CPC ..... *H04N 5/23206* (2013.01); *H04N 5/23241* (2013.01); *H04N 5/23245* (2013.01); *H04N 5/23293* (2013.01); *H04N 9/735* (2013.01)

(56) References Cited

U.S. PATENT DOCUMENTS

| | | |
|---|---|---|
| 2003/0090571 A1 | 5/2003 | Scheurich |
| 2004/0105107 A1 | 6/2004 | Takahashi |
| 2004/0199303 A1 | 10/2004 | Ohmura et al. |
| 2007/0058074 A1 | 3/2007 | Yamagishi |
| 2008/0309961 A1 | 12/2008 | Aichi et al. |
| 2009/0080807 A1 | 3/2009 | Kojima et al. |
| 2010/0020185 A1 | 1/2010 | Sako et al. |
| 2011/0073767 A1 | 3/2011 | Iwakiri et al. |
| 2011/0310247 A1 | 12/2011 | Rensin et al. |
| 2012/0026379 A1 | 2/2012 | Mori et al. |
| 2012/0307080 A1 | 12/2012 | Yumiki et al. |
| 2013/0242148 A1 | 9/2013 | Mlinar et al. |
| 2013/0332706 A1 | 12/2013 | Tanaka |

FOREIGN PATENT DOCUMENTS

| | | |
|---|---|---|
| JP | 2003-087618 A | 3/2003 |
| JP | 2004-304732 A | 10/2004 |
| JP | 2005-065136 A | 3/2005 |
| JP | 2006-074541 A | 3/2006 |
| JP | 2008-079260 A | 4/2008 |
| JP | 2009-044256 A | 2/2009 |
| JP | 2010-171620 A | 8/2010 |
| JP | 2011-072678 A | 4/2011 |
| JP | 2012-256319 A | 12/2012 |

OTHER PUBLICATIONS

May 25, 2016 Office Action issued in U.S. Appl. No. 14/768,924.
Sep. 16, 2016 Search Report issued in European Patent Application No. 13876611.8.
Feb. 8, 2017 Office Action issued in U.S. Appl. No. 14/768,924.
May 2, 2017 Office Action issued in Japanese Patent Application No. 2015-502706.
Aug. 28, 2017 Office Action Issued in U.S. Appl. No. 15/645,095.
Sep. 27, 2017 Chinese Office Action issued in Chinese Application No. 201380076046.5.
Feb. 27, 2018 Office Action issued in U.S. Appl. No. 15/645,095.
Jan. 24, 2018 Office Action issued in European Patent Application No. 13 876 611.8.
May 23, 2018 Office Action Issued in Chinese Patent Application No. 201380076046.5.
Jun. 5, 2018 Office Action issued in Japanese Patent Application No. 2017-168339.
Aug. 31, 2018 Notice of Allowance issued in U.S. Appl. No. 15/645,095.
Oct. 3, 2018 Corrected Notice of Allowability issued in U.S. Appl. No. 15/645,095.
Jul. 2, 2019 Office Action Issued in Japanese Patent Application No. 2018-216594.
Jul. 17, 2019 Office Action issued in U.S. Appl. No. 16/427,506.
Aug. 28, 2019 Office Action issued in European Patent Application No. 13876611.8.

ELECTRONIC APPARATUS AND METHOD FOR CONDITIONALLY PROVIDING IMAGE PROCESSING BY AN EXTERNAL APPARATUS

CROSS-REFERENCE TO RELATED APPLICATION(S)

This application is a divisional of U.S. patent application Ser. No. 15/645,095 filed Jul. 10, 2017 which is a continuation application of U.S. patent application Ser. No. 14/768,924, filed on Nov. 6, 2015, which in turn is a National Phase Application of PCT/JP2013/071711, filed on Aug. 9, 2013, and claims priority to Japanese Patent Application No. 2013-039128, filed on Feb. 28, 2013, the above applications being hereby incorporated by reference in their entirety.

DESCRIPTION

Technical Field

The present invention relates to an electronic apparatus.

Background Art

A prior art digital camera system is per se known that transmits an image capture signal from an imaging element (so-called RAW data) to a server, and image processing is performed upon this image capture signal by an image processing unit that is provided in the server (for example, refer to Patent Document #1).

CITATION LIST

Patent Literature

Patent Document #1: Japanese Laid-Open Patent Publication 2003-87618.

SUMMARY OF INVENTION

Technical Problem

With the prior art technique, there has been the problem that the convenience of use of the camera is poor, since the image processing is always performed by the server.

Solution To Technical Problem

According to the 1st aspect of the present invention, an electronic apparatus comprises: a processing unit that processes an image capture signal captured by an image capturing unit; a communication unit that is capable of transmitting the image capture signal captured by the image capturing unit to an external apparatus; and a determination unit that determines whether or not to transmit the image capture signal to the external apparatus, according to a capture setting for the image capturing unit.

According to the 2nd aspect of the present invention, it is preferred that in the electronic apparatus according to the 1st aspect, the communication unit transmits information related to details of the processing by the processing unit to the external apparatus.

According to the 3rd aspect of the present invention, it is preferred that in the electronic apparatus according to the 2nd aspect, the communication unit transmits information specifying at least one of a specification and parameters of the processing unit to the external apparatus.

According to the 4th aspect of the present invention, the electronic apparatus according to any one of the 1st through 3rd aspects may further comprise a recording unit that records a movie image and a still image upon a recording medium; and the determination unit may transmit the image capture signal to the external apparatus when the recording unit is to record the movie image upon the recording medium.

According to the 5th aspect of the present invention, the electronic apparatus according to any one of the 1st through 4th aspects may further comprise a setting unit that is capable of setting the image capturing unit to a movie image mode and to a still image mode; and the determination unit may transmit the image capture signal to the external apparatus when the movie image mode is set by the setting unit.

According to the 6th aspect of the present invention, the electronic apparatus according to the 5th aspect may further comprise a display unit that displays an image processed by the external apparatus as a live view.

According to the 7th aspect of the present invention, an electronic apparatus comprises: a processing unit that processes an image capture signal captured by an image capturing unit; a communication unit that is capable of transmitting the image capture signal captured by the image capturing unit to an external apparatus; and a determination unit that determines whether or not to transmit the image capture signal to the external apparatus, according to a state of generation of heat from at least one of the image capturing unit and the processing unit.

According to the 8th aspect of the present invention, it is preferred that in the electronic apparatus according to the 7th aspect, the determination unit determines whether or not to transmit the image capture signal to the external apparatus, according to a state of generation of heat from the communication unit.

According to the 9th aspect of the present invention, the electronic apparatus according to the 7th or 8th aspect may further comprise a temperature detection unit that detects the temperature of at least one of the image capturing unit, the processing unit, and the communication unit.

According to the 10th aspect of the present invention, the electronic apparatus according to any one of the 7th through 9th may further comprise a recording unit that records a movie image and a still image upon a recording medium; and the determination unit may transmit the image capture signal to the external apparatus when the recording unit is to record the movie image upon the recording medium.

According to the 11th aspect of the present invention, an electronic apparatus comprise: a processing unit that processes an image capture signal captured by an image capturing unit; a communication unit that is capable of transmitting the image capture signal captured by the image capturing unit to an external apparatus; and a determination unit that determines whether or not to transmit the image capture signal to the external apparatus, according to a state of generation of heat from the communication unit.

According to the 12th aspect of the present invention, the electronic apparatus according to the 11th aspect may further comprise a temperature detection unit that detects the temperature of the communication unit.

According to the 13th aspect of the present invention, it is preferred that in the electronic apparatus according to the 11th or 12th aspect, the communication unit transmits the image capture signal and information related to the processing unit to the external apparatus.

Advantageous Effects of Invention

According to the present invention, it is possible to provide an electronic apparatus whose convenience of use is good.

DESCRIPTION OF EMBODIMENTS

Embodiment #1

Figure 1:
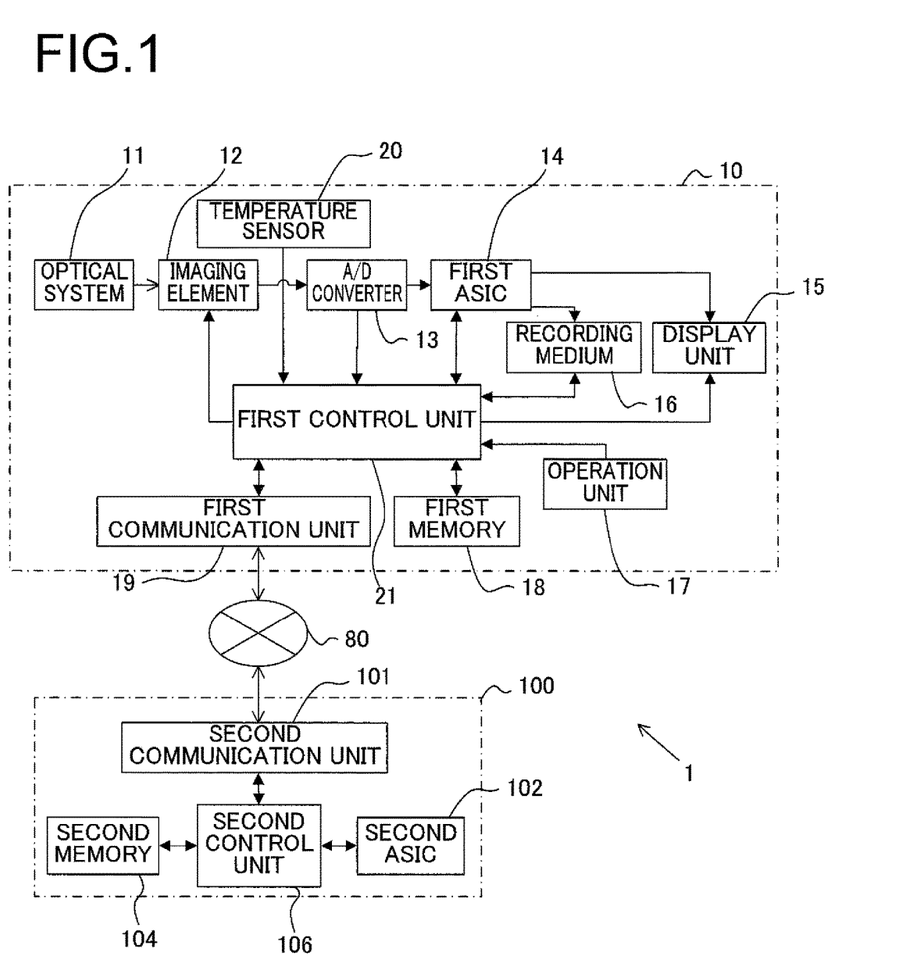
FIG. 1 is a block diagram showing the structure of a photography system according to a first embodiment of the present invention.

FIG. 1 is a block diagram showing the structure of a photography system according to a first embodiment of the present invention. This photography system 1 comprises a camera 10 and a server 100. The camera 10 and the server 100 are connected together via a network 80, such as for example a LAN or a WAN, and are capable of performing mutual data communication in both directions.

The camera 10 is a so-called integrated lens type digital camera that obtains image data by capturing an image of a photographic subject that has been focused by an optical system 11 consisting of a plurality of lens groups with an imaging element 12 that may, for example, be a CMOS or a CCD or the like. The camera 10 comprises an A/D converter 13, a first ASIC 14, a display unit 15, a recording medium 16, an operation unit 17, a first memory 18, a first communication unit 19, a temperature sensor 20, and a first control unit 21.

The A/D converter 13 converts an analog image signal outputted from the imaging element 12 to a digital image signal. The first ASIC 14 is a circuit that performs image processing of various kinds (for example, color interpolation processing, tone conversion processing, image compression processing, or the like) upon the digital image signal outputted by the A/D converter 13. And the first ASIC 14 outputs the digital signal upon which it has performed the image processing described above to the display unit 15 and/or to the recording medium 16. The imaging element 12 and the first ASIC 14 are disposed close to one another within the casing of the camera 10, and the processing load upon the imaging element 12 and upon the first ASIC 14 increases during capture of a movie image or during image processing of a movie image, and accordingly the amount of heat generated raises the temperature of the imaging element 12 and the temperature of the first ASIC 14.

The display unit 15 is a display device that comprises, for example, a liquid crystal panel or the like, and displays images (still images and moving images) on the basis of digital image signals outputted by the first ASIC 14, and operating menu screens of various types and so on. And the recording medium 16 is a transportable type recording medium such as, for example, an SD card (registered trademark) or the like, and records image files on the basis of digital image signals outputted by the first ASIC 14. Furthermore, the operation unit 17 includes various operation members, such as a release switch for commanding preparatory operation for photography and photographic operation, a touch panel upon which settings of various types are established, a mode dial that selects the photographic mode, and so on. When the user operates these operation members, the operation unit 17 outputs operating signals corresponding to these operations to the first control unit 21. It should be understood that it would be acceptable to arrange for commands for photographing a still image and a movie image to be issued with the release switch, or alternatively a dedicated movie image capture switch may be provided. Moreover, the mode dial of this embodiment is capable of setting at least one of a plurality of still image modes and a movie image mode.

The first memory 18 is a non-volatile semiconductor memory such as, for example, a flash memory or the like, and the first control unit 21 stores therein in advance a control program and control parameters and so on so that the first control unit 21 controls the camera 10. The first communication unit 19 is a communication circuit that performs data communication to and from the server 100 via the network 80, for example by wireless communication. And the temperature sensor 20 is provided in the neighborhood of the imaging element 12, and detects the temperature of the imaging element 12 (in other words, the state of heat generation by the imaging element 12).

The first control unit 21 comprises a microprocessor, memory, and peripheral circuitry not shown in the figures, and provides overall control for the camera 10 by reading in and executing a predetermined control program from the first memory 18.

The server 100 comprises a second communication unit 101, a second ASIC 102, a second memory 104, and a second control unit 106. The second communication unit 101 is a communication circuit that performs data communication to and from the camera 10 via the network 80, for example by wireless communication. And the second ASIC 102 is a circuit that performs image processing similar to that performed by the first ASIC 14.

The second memory 104 is a non-volatile semiconductor memory such as, for example, a flash memory or the like, and stores therein in advance a control program and control parameters and so on so that the second control unit 106 controls the server 100. In addition to the control program and the control parameters and so on mentioned above, this second memory 104 also is capable of storing image data upon which image processing of various types has been performed by the second ASIC 102.

Next, live view display performed by this camera 10 will be explained. When the power supply of the camera 10 is in the ON state, the first control unit 21 performs so-called live view display upon the display unit 15. When performing this live view display, the first control unit 21 captures an image of the photographic subject with the imaging element 12, and outputs a digital image signal corresponding to this photographic subject image to the A/D converter 13. It should be understood that, as previously described, with the mode dial of this embodiment, it is possible to establish any one of a plurality of settings for still image photography, and to establish a setting for movie image photography. The first ASIC 14 changes the processing for live view display according to whether the mode dial is set for photography of a still image or for photography of a movie image. In concrete terms, by contrast to the case of live viewing in a still image mode in which the live view image is generated by thinning out the image captured by the imaging element 12 so that the amount of calculation by the first ASIC 14 is reduced, in the case of live viewing in the moving image mode the imaging element 12 and the first ASIC 14 generate a live view image having the same resolution as the recording size for the movie image. In other words, in this embodiment, the amount of heat generated by the imaging element 12 and the first ASIC 14 becomes greater during live view in the movie image mode, than during live view in a still image mode.

On the basis of the operational state of the camera 10 (i.e. whether the live viewing is in a still image mode or is in the movie image mode), the first control unit 21 determines whether to control the first ASIC 14 within the camera 10 to process this digital image signal, or to control the second ASIC 102 within the server 100 to perform this processing. And if the first control unit 21 has determined that the first ASIC 14 is to be controlled to process this digital image signal, then image data that has been produced by the first ASIC 14 performing various types of image processing upon the digital image signal (i.e. a live view image) is displayed upon the display unit 15.

On the other hand, if the first control unit 21 has determined that the second ASIC 102 is to be controlled to process the digital image signal, then the first control unit 21 transmits the digital image signal that has been outputted by the A/D converter 13 to the server 100 via the first communication unit 19. And, upon receipt of this digital image signal via the second communication unit 101, the second control unit 106 within the server 100 causes the second ASIC 102 to perform processing upon this received digital image signal. The second ASIC 102 generates image data (i.e. a live view image) by performing image processing of various types upon this digital image signal. And the second control unit 106 transmits this image data (i.e. the live view image) that has been generated by the second ASIC 102 to the camera 10 via the second communication unit 101. Upon receipt of this image data (i.e. the live view image) via the first control unit 21, the first control unit 21 within the camera 10 displays the live view image upon the display unit 15.

Figure 2:
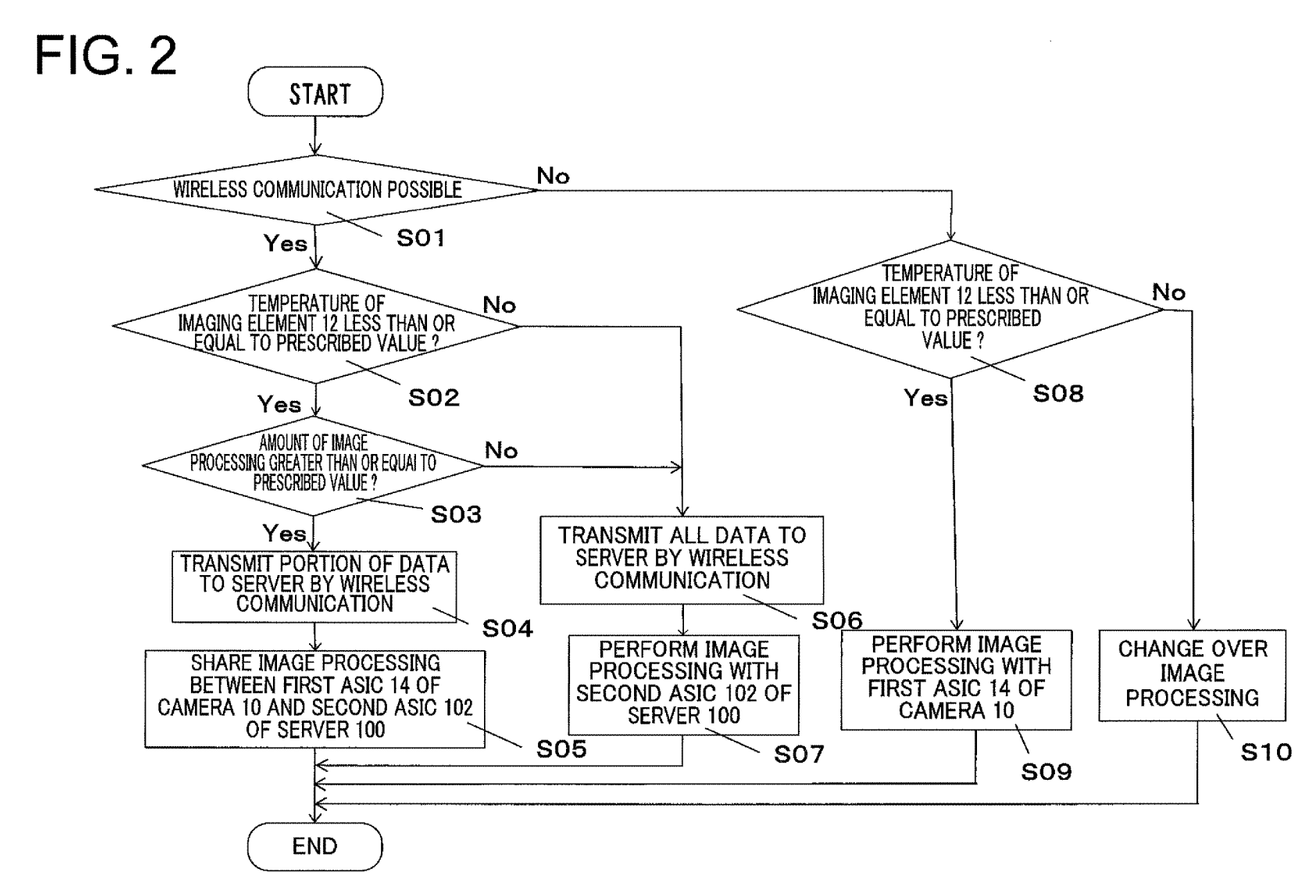
FIG. 2 is a flow chart showing live view processing executed by a first control unit 21.

FIG. 2 is a flow chart showing the live view processing executed by the first control unit 21; in this embodiment, the processing shown in this flow chart is started in the case of live view in the movie image mode. In a first step S01, the first control unit 21 determines whether or not it is possible to perform wireless communication with the first communication unit 19. If the state is such that wireless communication with the first communication unit 19 is possible, then the flow of control proceeds to step S02.

In step S02, the first control unit 21 makes a decision as to whether or not the temperature of the imaging element 12, which has been detected with the temperature sensor 20, is less than or equal to a predetermined threshold value (for example 70° C.). If the temperature of the imaging element 12 is less than or equal to the predetermined threshold value, then the flow of control proceeds to step S03. In this step S03, the first control unit 21 makes a decision as to whether or not the amount of image processing (i.e. the amount of calculation) required in order to generate image data (i.e. a live view image) will be greater than or equal to a predetermined threshold value. If the amount of image processing is greater than or equal to the predetermined threshold value, then the flow of control proceeds to step S04. It should be understood that it would also be acceptable to arrange for the predetermined threshold value to be set in five ° C. steps, as appropriate.

In step S04, by wireless communication via the first communication unit 19, the first control unit 21 transmits a portion of the digital image signal outputted from the A/D converter 13 to the server 100. And in the next step S05 the first ASIC 14 of the camera 10 and the second ASIC 102 of the server 100 share the image processing upon the digital image signal between one another.

As a method of sharing the image processing by the first ASIC 14 and the second ASIC 102, it may be suggested repeatedly to perform changeover processing to the second ASIC 102, after processing by the first ASIC 14 has been performed for some fixed time period. Alternatively, if the first control unit 21 displays the image data (i.e. the live view image) upon the display unit 15 at a rate of sixty frames per second, then, among the digital image signals outputted from the A/D converter 13 at the rate of sixty times per second, the first control unit 21 may output the odd numbered frames to the first ASIC 14, and may transmit the even numbered frames to the server 100 via the first communication unit 100. And in this case it is suggested that the first ASIC 14 should perform image processing upon the odd numbered frames, while the second ASIC 102 performs image processing upon the image numbered frames.

On the other hand, if in step S03 the amount of image processing is less than the predetermined threshold value and if in step S02 the temperature of the imaging element 12 is less than the predetermined threshold value, then the flow of control is transferred to step S06. In this step S06, the first control unit 21 transmits the digital image signal outputted from the A/D converter 13 to the server 100 by wireless communication via the first communication unit 19. And then in step S07 the second ASIC 102 of the server 100 performs image processing upon the digital image signal received via the second communication unit 101, and thereby generates image data (i.e. a live view image).

If in step S01, due to some reason such as, for example, the camera 10 being a long way away from the base station for wireless communication or the like, a state becomes established in which wireless communication between the camera 10 and the server 100 is not possible, then the flow of control is transferred to step S08. In this step S08, the first control unit 21 makes a decision as to whether or not the temperature of the imaging element 12 detected by the temperature sensor 20 is less than or equal to a predetermined threshold value. If the temperature of the imaging element 12 is less than or equal to the predetermined threshold value, then the flow of control proceeds to step S09. In this step S09, the first control unit 21 inputs the digital image signal outputted from the A/D converter 13 to the first ASIC 14, and generates image data (i.e. a live view image) by performing image processing upon this digital image signal with the first ASIC 14.

On the other hand, if the temperature of the imaging element 12 is greater than the predetermined threshold value, then the flow of control is transferred to step S10. In this step S10, the first control unit changes over from live view in the movie image mode to live view in a still image mode, thus alleviating the amount of processing by the imaging element 12 and the first ASIC 14.

As described above, in the live view image generation processing, the first control unit 21 determines whether or not to transmit the digital image signal to the server 100 by referring to three operational states of the camera 10, i.e. whether or not wireless communication with the first communication unit 19 is possible, the temperature of the imaging element 12 as detected by the temperature sensor 20, and the amount of image processing (i.e. the image processing load or the amount of calculation) to be performed by the first ASIC 14.

If wireless communication can be performed (i.e. if an affirmative decision is reached in step S01), then the first communication unit 21 causes the second ASIC 102 in the server 100 to perform processing of the digital image signal outputted from the A/D converter 13. Since, due to this, the burden of calculation upon the first ASIC 14 is reduced and the amount of heat generated by the first ASIC 14 decreases, accordingly rise of the temperature of the imaging element 12 is suppressed.

Embodiment #2

The photography system according to the second embodiment has a similar structure to that of the photography system according to the first embodiment, with the exception that a temperature sensor not shown in the figures is provided in the neighborhood of the first communication unit 19. This temperature sensor not shown in the figures detects the temperature of the first communication unit 19. In a similar manner to the case with the first ASIC 14, the amount of heat generated by the first communication unit 19 increases as the amount of communication (i.e. the amount of data communicated) increases, and this generated heat is supplied to the imaging element 12 which is provided within the same casing according to the amount of communication In live view image generation processing, in addition to referring to three operational states of the camera 10, i.e. to whether or not wireless communication with the first communication unit 19 is possible, to the temperature of the imaging element 12 as detected by the temperature sensor 20, and to the amount of image processing (i.e. the image processing load or the amount of calculation) to be performed by the first ASIC 14, the first control unit 21 of this embodiment determines whether or not to transmit the digital image signal to the server 100 by further referring to the temperature of the first communication unit 19 as detected by a temperature sensor not shown in the figures.

Figure 3:
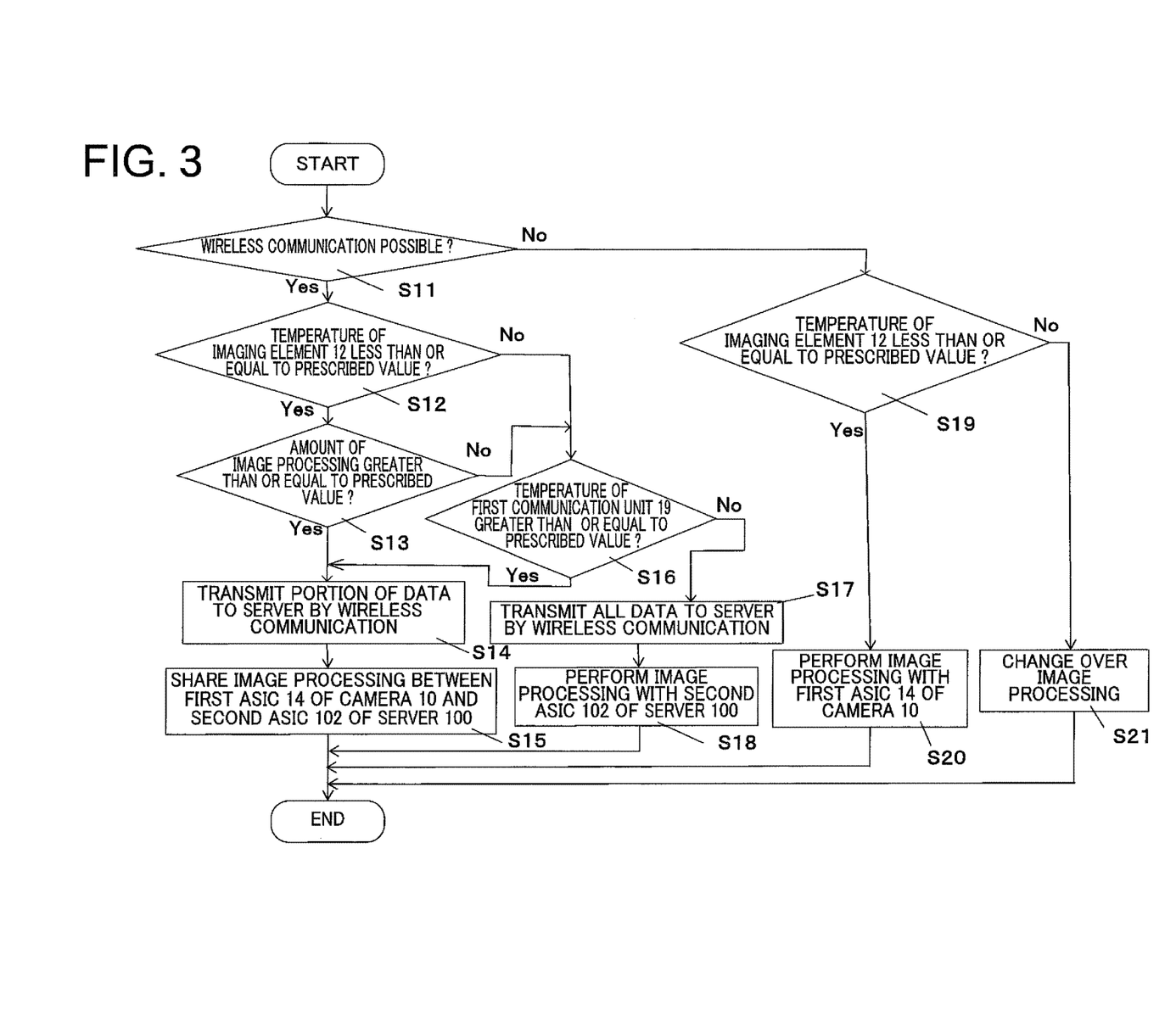
FIG. 3 is a flow chart showing live view processing executed by a first control unit 21 according to a second embodiment.

FIG. 3 is a flow chart showing the live view processing executed by the first control unit 21 according to this second embodiment. In a first step S11, the first control unit 21 determines whether or not it is possible to perform wireless communication with the first communication unit 19. If the situation is such that wireless communication with the first communication unit 19 is possible, then the flow of control proceeds to step S12.

In step S12, the first control unit 21 makes a decision as to whether or not the temperature of the imaging element 12, which has been detected with the temperature sensor 20, is less than or equal to a predetermined threshold value. If the temperature of the imaging element 12 is less than or equal to the predetermined threshold value, then the flow of control proceeds to step S13. In this step S13, the first control unit 21 makes a decision as to whether or not the amount of image processing (i.e. the amount of calculation) required in order to generate image data (i.e. a live view image) will be greater than or equal to a predetermined threshold value. If the amount of image processing is greater than or equal to the predetermined threshold value, then the flow of control proceeds to step S14.

In step S14, by wireless communication via the first communication unit 19, the first control unit 21 transmits a portion of the digital image signal outputted from the A/D converter 13 to the server 100. And in the next step S05 the first ASIC 14 of the camera 10 and the second ASIC 102 of the server 100 share the image processing upon the digital image signal between one another.

On the other hand, if in step S13 the amount of image processing is less than the predetermined threshold value and if in step S12 the temperature of the imaging element 12 is less than the predetermined threshold value, then the flow of control is transferred to step S16. In this step S16, the first control unit 21 makes a decision as to whether or not the temperature of the first communication unit 19, which has been detected with the temperature sensor not shown in the figures, is less than or equal to a predetermined threshold value (for example, 60° C.). If the temperature of the first communication unit 19 is less than or equal to the predetermined threshold value, then the flow of control proceeds to step S17. In this step S17, the first control unit 21 transmits the digital image signal outputted from the A/D converter 13 to the server 100 by wireless communication via the first communication unit 19. And then in step S18 the second ASIC 102 of the server 100 performs image processing upon the digital image signal that has been received via the second communication unit 101, and thereby generates image data (i.e. a live view image).

If in step S16 the temperature of the first communication unit 19 is greater than the predetermined threshold value, then the flow of control proceeds to step S14. In step S14 and step S15, as already explained, the first control unit 21 transmits a portion of the digital image signal outputted from the A/D converter 13 to the server 100 by wireless communication via the first communication unit 19, and image processing is performed by being shared between the first ASIC 14 of the camera 10 and the second ASIC 102 of the server 100. This is a preventative measure in case the temperature of the first communication unit 19 should become too high. It should be understood that the threshold value for the temperature of the first communication unit 19 may be set in five ° C. steps, as appropriate.

Moreover, instead of steps S14 and S15, if the temperature of the first communication unit 19 becomes greater than or equal to a prescribed value, it may also be arranged for the control unit 21 to stop transmitting the digital image to the server 100 with the first communication unit 19, and the first ASIC 14 to perform image processing.

It should be understood that, since the processing (i.e. steps S19 through S21) following the processing in step S11 which is performed when the system is in a state in which wireless communication between the camera 10 and the server 100 is not possible is the same as the processing of the steps S08 through S10 of FIG. 2 explained in connection with the first embodiment, and accordingly explanation thereof is omitted.

Embodiment #3

The photography system according to the third embodiment has a structure corresponding to that of the photography system according to the first embodiment, but with the temperature sensor 20 eliminated. During photography of a still image in a still image photographic mode, the first control unit 21 performs image processing with the first ASIC 14, while, during movie image photography in the movie image photographic mode, image processing is performed by the second ASIC 102 of the server 100. Since in this manner, in this third embodiment, the first control unit 21 determines according to the photographic mode whether image processing should be performed by the first ASIC 14 or by the second ASIC 102, accordingly it is possible to simplify the structure and the control of the photography system.

Variations of the following types also fall within the scope of the present invention, and moreover one or more of the following variant embodiments can also be combined with one or a plurality of the embodiments described above.

Variant Embodiment #1

By contrast with the fact that in the first embodiment, for example, the live view image generated by the first ASIC 14 is outputted to the display unit 15 almost in real time, the live view image generated by the second ASIC 102 needs to be sent via wireless communication by the first communication unit 19 and the second communication unit 101, so that some delay inevitably occurs. In order to suppress this delay, it will be acceptable to arrange for the first control unit 21 to buffer the live view image outputted by the first ASIC 14 and the live view image received by the first communication unit 19 in a memory not shown in the figures, so that the display of the live view image is always delayed by a constant time interval (for example 0.5 seconds). Due to this, the live view image that is displayed upon the display unit 15 continues to be shown smoothly, even if a delay occurs in the transmission of the live view image that is transmitted from the server 100.

Furthermore, during changing over between the ASICs that are employed for generating the live view image, it would also be acceptable to arrange to provide an interval during which the first control unit 21 operates both the first ASIC 14 and the second ASIC 102. By doing this, no temporary interruption of the live view image takes place when changing over is performed. This point will now be explained in more detail in the following.

Figure 4:
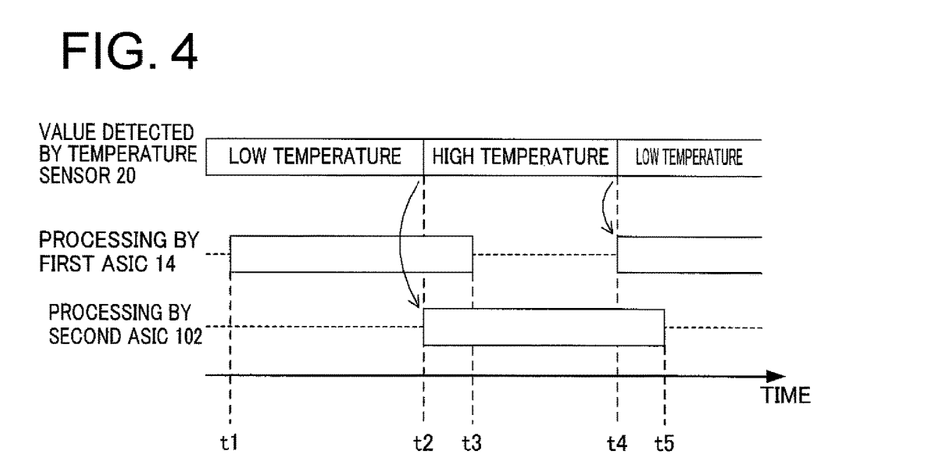
FIG. 4 is a time chart showing changeovers between a first ASIC 14 and a second ASIC 102 along with changes of temperature of an imaging element 12.

FIG. 4 is a time chart showing several changeovers between the first ASIC 14 and the second ASIC 102 along with changes of temperature of the imaging element 12. It should be understood that in FIG. 4, in order to simplify the explanation, it is supposed that the first ASIC 14 and the second ASIC 102 do not share the image processing between them, as in steps SO4 and S05 of FIG. 2.

Image processing by the first ASIC 14 is started at the time point t1, so that live view display upon the display unit 15 starts. Subsequent to the time point t1, the first ASIC 14 generates heat by repeatedly executing image processing, so that the temperature of the imaging element 12 rises. And thereafter, at the time point t2, the temperature of the imaging element 12 as detected by the temperature sensor 20 becomes greater than the threshold value. Although the first control unit 21 starts transmission of the digital image signal outputted from the A/D converter 13 to the server 100 at this time point, the first control unit 21 causes the first ASIC 14 to execute in parallel the image processing. And at the time point t3, at which point a time interval has elapsed that is sufficient for absorbing the delay accompanying wireless communication, the first control unit 21 stops image processing by the first ASIC 14.

Subsequent to the time point t3, since the first ASIC 14 is not performing any processing, accordingly the amount of heat that it generates is extremely low, and therefore increase of the temperature of the imaging element 12 is prevented. As a result, at the time point t4, the temperature of the imaging element 12 as detected by the temperature sensor 20 becomes less than or equal to the threshold value. Although, corresponding thereto, the first control unit 21 resumes image processing by the first ASIC 14, transmission of the digital image signal to the server 100 is still performed in parallel therewith, in a similar manner to the case at the time point t2. And then at the time point t5, when a fixed time period has elapsed, the first control unit 21 stops the transmission of the digital image signal to the first control unit 21. By overlapping the operations of the two ASICs in this manner when changing over between them, it is possible to keep the influence of delay in communication to the minimum limit.

Variant Embodiment #2

Figure 5:
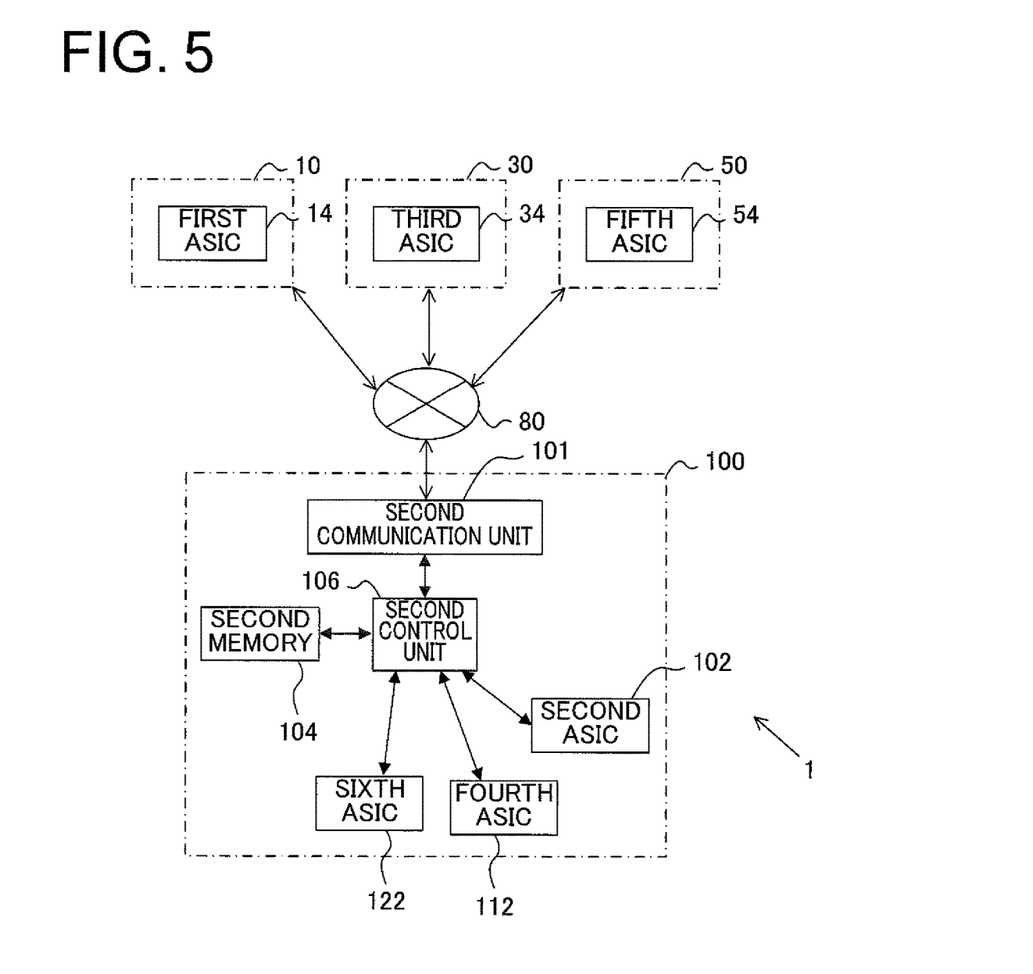
FIG. 5 is a figure showing an example in which a plurality of cameras are connected to a single server 100.

While, in FIG. 1, a photography system was shown in which the single camera 10 and the single server 100 were connected together by the network 80, it would also be possible for a plurality of cameras to be connected to a single server, and it would also be possible for a plurality of servers and a plurality of cameras to be connected together. FIG. 5 shows an example in which a plurality of cameras (a camera 10, a camera 30, and a camera 50) are connected to a single server 100.

In FIG. 5, each of the camera 10, the camera 30, and the camera 50 creates different photographic image data by performing photographic processing. In more concrete terms, the details of the image processing that each of a first ASIC 14 comprised in the camera 10, a third ASIC 34 comprised in the camera 30, and a fifth ASIC 54 comprised in the camera 50 can perform are different. Accordingly, even if the same analog image signals are outputted from their corresponding imaging elements 12, the image data generated by the first ASIC 14, the image data generated by the third ASIC 34, and the image data generated by the fifth ASIC 54 will differ from one another, for example in hue and/or texture and so on.

The server 100 shown in FIG. 5 comprises, in addition to a second ASIC 102 that is capable of performing image processing equivalent to that performed by the first ASIC 14, a fourth ASIC 112 that is capable of performing image processing equivalent to that performed by the third ASIC 34 and a sixth ASIC 122 that is capable of performing image processing equivalent to that performed by the fifth ASIC 54. In other words, for example, the image data that has been generated due to image processing by the fourth ASIC 112 is approximately the same as the image data that has been generated due to image processing by the third ASIC 34.

With the photography system having the structure described above, along with its digital image signal, the control unit of each of the cameras transmits information related to the details of the image processing executed by its ASIC to the server 10. This information may be, for example, the name of the camera type, and/or information specifying the specification of its ASIC (color, white balance, texture, and so on), and/or parameters or the like of the image processing executed by its ASIC. And, on the basis of this information related to the details of image processing that has been received, the second control unit 106 determines which ASIC is to be used for performing processing upon the digital image signal that have been received along with this information. For example, if a digital image signal has been received from the camera 30, the second control unit 106 may cause processing thereof to be performed by the fourth ASIC 112.

Variant Embodiment #3

While, in the first embodiment described above, the temperature sensor 20 was provided in the neighborhood of the imaging element 12, and the first control unit 21 determined whether or not it was possible to transmit the digital image signal on the basis of the temperature of the imaging element 12 as detected by this temperature sensor 20, it would also be acceptable to arrange to provide the temperature sensor 20 in the neighborhood of the first ASIC 14, and to determine whether or not it is possible to transmit the digital image signal, not on the basis of the temperature of the imaging element 12, but rather on the basis of the temperature of the first ASIC 14. The same variation would be possible in the case of the second embodiment. Moreover, it would also be possible not to determine whether or not it is possible to transmit the digital image signal on the basis of the temperature detected by the temperature sensor 20, but rather on the basis of the change over time of the temperature detected by the temperature sensor 20 (i.e. on the basis of the temperature gradient). Yet further, it would also be possible to provide temperature sensors in the neighborhoods of both the imaging element 12 and the first ASIC 14.

Variant Embodiment #4

It would also be possible for the device that is provided exterior to the camera 10 and that receives the digital image signal from the camera 10 and performs image processing thereof to be some type of external apparatus other than a server 100; for example, it could be a portable type electronic apparatus such as a personal computer or a so-called smart phone, or a tablet-type (slate-type) computer or the like.

Variant Embodiment #5

In the embodiment described above, an example was explained which was an integrated lens type digital camera. However, the present invention is not limited to this type of embodiment. For example, it would also be possible to apply the present invention to a so-called single lens reflex type digital camera whose lens is interchangeable, or to a digital camera of the interchangeable lens type that has no quick return mirror (i.e. a mirror-less camera), or to a portable type electronic apparatus such as a tablet type computer or the like. It should be understood that in the case of a single lens reflex type digital camera it would also be possible to provide a live view button or switch that performs live view display, and in this case it could be set to movie image live view or to still image live view. It would also be possible to apply the first embodiment to this case as well.

The present invention is not to be considered as being limited to the embodiments described above; provided that the particular characteristics of the present invention are preserved, other embodiments that are considered to fall within the range of the technical concept of the present invention are also included within the scope of the present invention.

The contents of the disclosure of the following application, upon which priority is claimed, are hereby incorporated herein by reference:
Japanese Patent Application 2013-39,128 (filed on Feb. 28, 2013).

REFERENCE SIGNS LIST

1: photography system; 10, 30, 50: cameras; 11: optical system; 12: imaging element; 13: A/D converter; 14: first ASIC; 15: display unit; 16: recording medium; 17: operation unit; 18: first memory; 19: first communication unit; 20: temperature sensor; 21: first control unit; 80: network; 100: server; 101: second communication unit; 102: second ASIC; 104: second memory; 106: second control unit.

The invention claimed is:

1. An electronic apparatus comprising:
   a photography unit that performs photography and outputs prior-to-processing image data;
   a communication unit that is capable of communicating with an external apparatus, which includes an image processing unit and communicates with a plurality of electronic apparatuses, and, after transmitting the prior-to-processing image data to the external apparatus, receives externally-processed image data generated by processing on the prior-to-processing image data by the image processing unit of the external apparatus;
   a selection unit that is capable of selecting a photographic mode of the photography unit to a movie image photographic mode or to a still image photographic mode;
   a determination unit that determines whether or not the prior-to-processing image data is to be transmitted to the external apparatus, according to selection of the movie image photographic mode or the still image photographic mode by the selection unit;
   a processing unit that processes the prior-to-processing image data to internally-processed image data; and
   a display unit that displays an image generated by the externally-processed image data or the internally-processed image data.

2. The electronic apparatus according to claim 1, wherein the determination unit determines that the prior-to-processing image data is to be transmitted to the external apparatus if the movie image photographic mode is selected by the selection unit, and determines that the prior-to-processing image data is not to be transmitted to the external apparatus if the still image photographic mode is selected by the selection unit.

3. The electronic apparatus according to claim 1, wherein the display unit displays a live-view image generated according to the externally-processed image data.

4. The electronic apparatus according to claim 1, wherein the prior-to-processing image data is image data outputted through movie image photography.

5. The electronic apparatus according to claim 1, further comprising
   a recording unit that records the internally-processed image data.

6. The electronic apparatus according to claim 1, wherein the prior-to-processing image data is data prior to performing color interpolation processing, data prior to performing tone conversion processing, data prior to performing contour enhancement processing, data prior to performing white balance adjustment processing, or data prior to performing image compression processing.

7. The electronic apparatus according to claim 1, wherein the externally-processed image data received by the communication unit is image data upon which color interpolation processing, tone conversion processing, contour enhancement processing, white balance adjustment processing, or image compression processing has been performed by the image processing unit of the external apparatus.

8. The electronic apparatus according to claim 1, wherein the prior-to-processing image data is a signal that is outputted from an image sensor included in the photography unit.

9. An electronic apparatus comprising
a photography unit that performs photography and outputs prior-to-processing image data;
a communication unit that is capable of communicating with an external apparatus, which includes an image processing unit and communicates with a plurality of electronic apparatuses, and, after transmitting the prior-to-processing image data to the external apparatus, receives externally-processed image data generated by processing on the prior-to-processing image data by the image processing unit of the external apparatus;
a determination unit that determines whether or not the prior-to-processing image data is to be transmitted to the external apparatus;
a processing unit that processes the prior-to-processing image data to internally-processed image data; and
a display unit that displays a live-view image generated according to the externally-processed image data.

10. The electronic apparatus according to claim 1, wherein
the communication unit transmits apparatus information of the electronic apparatus and the prior-to-processing image data together to the external apparatus.

11. The electronic apparatus according to claim 10, wherein
the apparatus information of the electronic apparatus is information related to processing performed by the electronic apparatus.

12. The electronic apparatus according to claim 11, wherein
the information includes color information and a parameter related to white balance adjustment.

13. A display method comprising:
outputting prior-to-processing image data from a photography unit; and
determining whether image processing is performed in an image processing unit of an external apparatus that communicates with a plurality of electronic apparatuses or an internal processing unit, according to whether a photographic mode of the photography unit is selected to a movie image photographic mode or a still image photographic mode, wherein
if it is determined that the image processing is performed in the image processing unit of the external apparatus, the prior-to-processing image data is transmitted to the external apparatus, externally-processed image data generated by processing on the prior-to-processing image data by the image processing unit of the external apparatus is received, and an image generated by the externally-processed image data is displayed.

14. A display method comprising:
outputting prior-to-processing image data from a photography unit; and
determining whether image processing is performed in an image processing unit of an external apparatus that communicates with a plurality of electronic apparatuses or an internal processing unit, wherein
if it is determined that the image processing is performed in the image processing unit of the external apparatus, the prior-to-processing image data is transmitted to the external apparatus, externally-processed image data generated by processing on the prior-to-processing image data by the image processing unit of the external apparatus is received, and an image generated by the externally-processed image data is displayed.

15. An electronic apparatus comprising:
an image processing unit that performs image processing; and
a communication unit that is capable of communicating with a plurality of external apparatuses each of which includes a photography unit outputting prior-to-processing image data and a display unit displaying an image, wherein
if the communication unit receives the prior-to-processing image data from one of the plurality of external apparatuses, the communication unit transmits externally-processed image data to the one of the plurality of external apparatuses, the externally-processed image data being generated by performing image processing on the received prior-to-processing image data by the image processing unit so as to be able to be displayed on the display unit of the one of the plurality of external apparatuses, and
the image processing performed by the image processing unit is equivalent to image processing performed in the one of the plurality of external apparatuses.

16. The electronic apparatus according to claim 15, wherein
the communication unit transmits image data of an image that is displayed as a live-view image on the display unit of the one of the plurality of external apparatuses.

17. The electronic apparatus according to claim 15, wherein
the prior-to-processing image data is image data outputted through movie image photography.

18. The electronic apparatus according to claim 15, further comprising
a recording unit that records the externally-processed image data which has been processed by the processing unit.

19. The electronic apparatus according to claim 15, wherein
the prior-to-processing image data received from the one of the plurality of external apparatuses is data prior to performing color interpolation processing, data prior to performing tone conversion processing, data prior to performing contour enhancement processing, data prior to performing white balance adjustment processing, or data prior to performing image compression processing.

20. The electronic apparatus according to claim 15, wherein
the communication unit receives apparatus information of the one of the plurality of external apparatuses and the prior-to-processing image data together from the one of the plurality of external apparatuses.

21. The electronic apparatus according to claim 20, wherein
the apparatus information of the one of the plurality of external apparatuses is information related to image processing performed by the one of the plurality of external apparatuses.

22. The electronic apparatus according to claim 21, wherein
the information includes color information and a parameter related to white balance adjustment.

* * * * *